United States Patent
Helleberg Andersen et al.

(10) Patent No.: US 9,270,404 B2
(45) Date of Patent: Feb. 23, 2016

(54) DYNAMIC SCHEDULING USING PON BANDWIDTH ALLOCATION ON LOWER AGGREGATION LEVELS

(75) Inventors: Ole Helleberg Andersen, Bording (DK); Michael Valentin Juhl, Them (DK)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 823 days.

(21) Appl. No.: 13/203,049

(22) PCT Filed: Feb. 24, 2009

(86) PCT No.: PCT/SE2009/050203
§ 371 (c)(1),
(2), (4) Date: Aug. 24, 2011

(87) PCT Pub. No.: WO2010/098701
PCT Pub. Date: Sep. 2, 2010

(65) Prior Publication Data
US 2011/0305455 A1 Dec. 15, 2011

(51) Int. Cl.
| | |
|---|---|
| *H04L 12/28* | (2006.01) |
| *H04J 14/00* | (2006.01) |
| *H04L 12/873* | (2013.01) |
| *H04Q 11/00* | (2006.01) |

(52) U.S. Cl.
CPC ............ *H04J 14/00* (2013.01); *H04L 12/2885* (2013.01); *H04L 47/52* (2013.01); *H04Q 11/0067* (2013.01); *H04Q 11/0071* (2013.01); *H04Q 2011/0064* (2013.01)

(58) Field of Classification Search
CPC ............ H04Q 11/0066; H04Q 11/0067; H04J 3/0682; H04L 47/24; H04L 47/2433; H04L 47/2441; H04L 47/50
See application file for complete search history.

(56) References Cited

U.S. PATENT DOCUMENTS

| | | | | |
|---|---|---|---|---|
| 7,502,563 | B2 * | 3/2009 | Nozue et al. | 398/69 |
| 7,564,852 | B2 * | 7/2009 | Das et al. | 370/395.41 |
| 7,623,451 | B2 * | 11/2009 | Lee et al. | 370/230 |
| 7,653,084 | B2 * | 1/2010 | Shin et al. | 370/468 |
| 7,697,844 | B2 * | 4/2010 | Guo et al. | 398/69 |
| 8,634,431 | B1 * | 1/2014 | Chiang et al. | 370/412 |
| 8,842,527 | B2 * | 9/2014 | Cioffi et al. | 370/229 |
| 2002/0173332 | A1 * | 11/2002 | Mukai et al. | 455/525 |
| 2004/0136712 | A1 * | 7/2004 | Stiscia et al. | 398/60 |
| 2004/0141759 | A1 * | 7/2004 | Stiscia et al. | 398/168 |
| 2004/0252714 | A1 * | 12/2004 | Oh et al. | 370/437 |
| 2005/0027874 | A1 * | 2/2005 | Kim et al. | 709/230 |
| 2006/0067691 | A1 * | 3/2006 | Hirano et al. | 398/71 |
| 2006/0182132 | A1 * | 8/2006 | Kim et al. | 370/401 |
| 2007/0019957 | A1 * | 1/2007 | Kim et al. | 398/72 |
| 2007/0074218 | A1 * | 3/2007 | Levy et al. | 718/102 |
| 2007/0127487 | A1 * | 6/2007 | Kim et al. | 370/392 |
| 2007/0133557 | A1 * | 6/2007 | Lee et al. | 370/395.4 |
| 2009/0067850 | A1 * | 3/2009 | Mizutani et al. | 398/154 |
| 2010/0067913 | A1 * | 3/2010 | Niibe et al. | 398/98 |
| 2010/0098414 | A1 * | 4/2010 | Kramer et al. | 398/45 |

* cited by examiner

*Primary Examiner* — Phirin Sam

(57) ABSTRACT

The present invention relates transmission network, which involves Passive Optical Network and thereto connected units, e.g. Optical Network Units. It is an object of the present invention to provide a solution to the upstream data packet traffic congestion problem in transmission networks that comprises a PON system. Said problem is solved by providing adapted node devices and methods for such scheduling control that within the prescribed standard requirements, e.g. QoS, for passive optical network systems eliminate the congestion problem.

21 Claims, 6 Drawing Sheets

DYNAMIC SCHEDULING USING PON BANDWIDTH ALLOCATION ON LOWER AGGREGATION LEVELS

TECHNICAL FIELD

The present invention relates transmission network, which involves Passive Optical Network and thereto connected units, e.g. Optical Network Units.

BACKGROUND

In a transmission network comprising a core network, said core network is usually an optical network due to its superior traffic capacity compared to electrical signaling networks. The optical signals may have to be converted, e.g. to electrical signals, when distributed to Network Terminals (NTs) or local distribution networks in the subscriber neighborhood. In an optical fiber telecommunications network, an Optical Network Unit (ONU) is provided for terminating the optical fiber transmission line and for converting between different transmission technologies, such as Passive Optical Network (PON) and another transmission technology. In other words, the object of the ONU is therefore to adapt the data traffic from one transmission technology to another transmission technology in the transition point between the two technologies.

According to the present standard specification regarding QoS, high priority packets of the incoming data packet traffic are sent before Low priority. Management traffic always has highest priority and Voice over IP traffic has higher priority than normal Internet traffic. Each ONU is therefore provided with a scheduling mechanism to obtain such a differencing function and performance regarding different classed data packets. The scheduling options in the ONU can be more or less advanced. Schemes like Strict Priority, Weighted Round Robin or Deficit Round Robin may be implemented increasing the complexity of the ONU. The ONU's advanced scheduling task is regarded as a necessity by network operators for providing and withhold QoS requirements for the PON network, as the incoming data packets often have to be stored according to QoS priority classification before transmitted in the upstream direction towards the OLT. In the point-to-multipoint Passive Optical Network the upstream bandwidth, i.e. the uplink bandwidth, is shared between multiple Optical Network Units (ONUs). The bandwidth is not necessary shared equally between ONUs connected to an upstream located Optical Link Termination (OLT). Even for a single ONU the bandwidth may vary over time. The PON Uplink interface between ONUs and OLT is supposed to be variable in bandwidth, while the interface between the ONU and NT is fixed at e.g. 1 Gbps. Said PON Uplink is controlled and allocated by the OLT independently of the fixed bandwidth and may therefore be shifted over time to a value below that of the fixed bandwidth. If the uplink bandwidth to the OLT is allocated below 1 Gbps, the ONU must involve means for accommodating received data packets. If the ONU is not provided with storing elements or enough buffering capacity, the ONU will start dropping packets when data packet congestion occurs.

SUMMARY

It is an object of the present invention to provide a solution to the upstream data packet traffic congestion problem in transmission networks that comprises a PON system.

Said problem is solved by providing adapted node devices and method for such scheduling control that within the prescribed standard requirements, e.g. QoS, for passive optical network systems eliminate the congestion problem.

This object is achieved by the characteristic features of the independent claims.

The claimed invention solves the problem by determining a momentary parameter value of at least one scheduling control parameter of a set of different scheduling control parameters. Each determined parameter value is transmitted downstream to at least one node comprising a scheduler, said node whereby the scheduling task for scheduling the upstream data packet communication is moved to said scheduler receiving the determined parameter value.

In a first aspect of the invention an Optical Network Unit, ONU, provided for terminating a passive optical network operating according to a PON transmission technology. Said unit is comprising a downlink interface for receiving upstream data packet communication from at least one downstream positioned network operating according to a second transmission technology. Further, the ONU comprises an uplink interface for transmitting upstream data packet communication to at least one upstream positioned PON network node via an optical uplink. Additionally, the ONU comprises converter means for converting data packet communication in a downstream direction from the PON transmission technology to the second transmission technology and converter means for converting data packet communication in an upstream direction from the second transmission technology to the PON technology. In the ONU is provided means for determining a momentary parameter value of at least one scheduling control parameter ($P_S$) of a set of different scheduling control parameters of the optical uplink and means for transmitting each determined scheduling control parameter value to at least the closest node in the downstream connected network operating according to the second transmission technology, which node comprises a scheduler, wherein each of said scheduling control parameter values is used for adapting the scheduler operation to the latest determined parameter values of the scheduling control parameter and a scheduler for scheduling the data packets upstream in the same order as they were scheduled by said downstream positioned scheduler and received by the downstream interface.

In a second aspect of the invention is provided a method for scheduling control of the upstream signal communication through an ONU. The method comprises the following steps of:

determining a momentary parameter value of at least one scheduling control parameter of a set of different parameters;

transmitting each determined parameter to a downstream positioned node comprising a scheduler transmitting upstream data packet communication received from said at least one node;

scheduling the data packets upstream in the same order as they were scheduled by the downstream positioned scheduler and received on the downlink interface.

In a third aspect of the invention is provided a Network Termination device comprising a scheduler, buffering means and a processing unit. The processing unit is adapted to control a message means for identifying and reading actual scheduling control parameters values received from an upstream positioned Optical Network Unit (ONU) device, and a means for adjusting the scheduling of the scheduler to operate according to the received actual scheduling control parameters values.

Different embodiments of the invention are disclosed in the dependent claims.

Said determined and transmitted parameter values may be the transmission bandwidth capacity of the optical uplink.

The advantages of the invention are reduced complexity in the ONU, thus cost, simpler management and easier software upgrade.

Moving the QoS decisions from the ONU thus making it more or less transparent will ensure that the mechanisms in the attached node apply.

The ONU continues to schedule the upstream traffic according to the actual uplink bandwidth, however the ONU is relieved from the task of fulfilling precedence requirements. The ONU only needs FIFO scheduling. More advanced scheduling, fulfilling the requirements of underlying equipment, is performed within that equipment. Traffic received from the attached node and network will therefore be in accordance with the uplink bandwidth and no reordering/packet drop is required in the ONU. Specifying the requirements for a passive optical network ONU device is much easier. No considerations need to be taken to ensure the ONU delivers the same QoS mechanisms as the connected device (e.g. IP DSLAM).

The management system will not need to keep the QoS mechanisms for the ONU and IP DSLAM synchronized. Only the IP DSLAM will need management to setup/maintain QoS on the passive optical network uplink.

Upgrading the QoS mechanisms/features for IP DSLAM/Switch vendors will only mean upgrading the IP DSLAM or switch. Since the ONU only performs FIFO scheduling, the ONU will not need to be upgraded. Time-to-market for additional QoS features could be significantly reduced.

DETAILED DESCRIPTION

Figure 1:
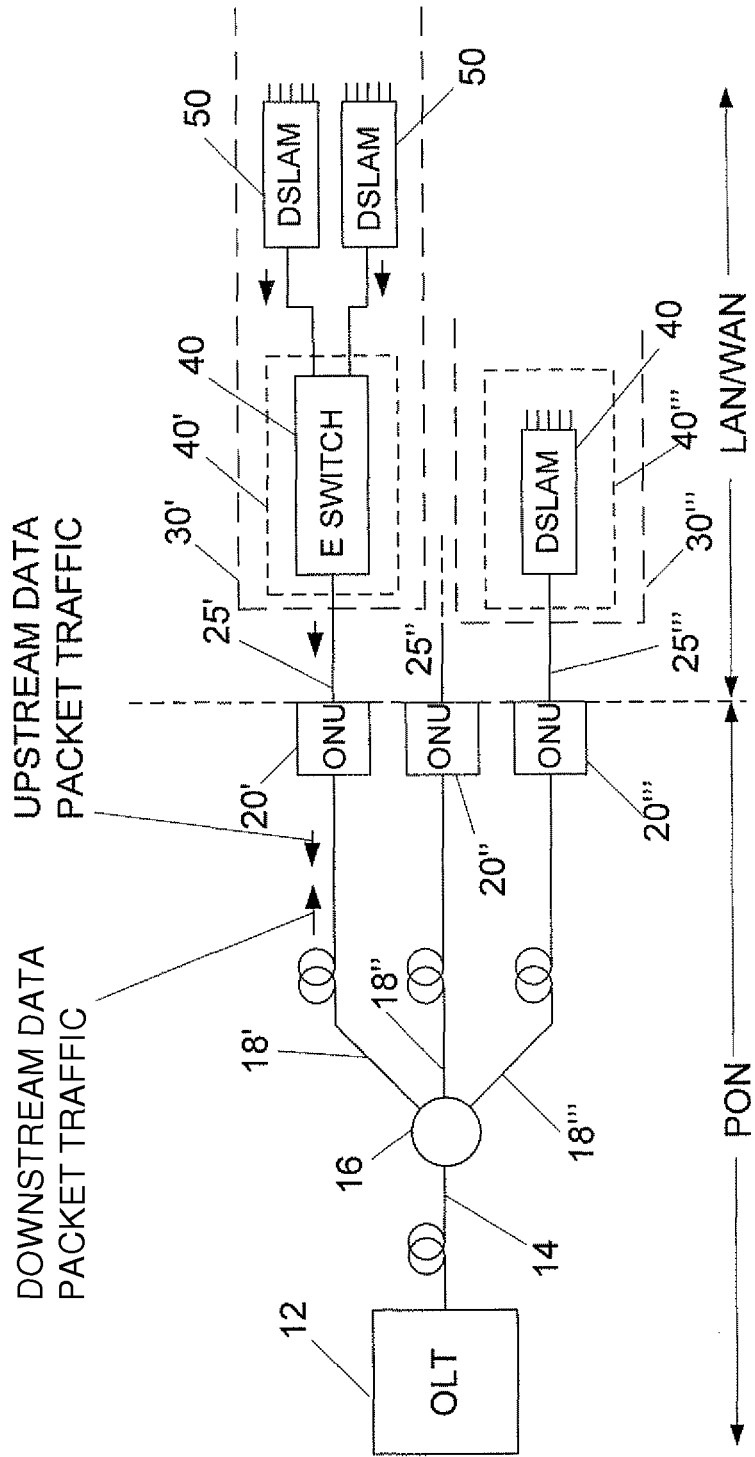
FIG. 1 is a block diagram illustrating a data transmission network according to the invention.

Embodiments of the present invention will now be described with reference to the above listed drawings. The function of the present invention is supported by a number of means, of which some will be described herein in more details, while other means are deliberately not described or illustrated in the drawings as they are considered to be obvious to a person skilled in the art.

FIG. 1 is a block diagram illustrating a data transmission network 10 according to the invention. The illustrated data transmission network comprises a Passive Optical Network (PON) and at least two Local Area Networks (LANs). The transition between said networks is indicated in FIG. 1 by a vertical dashed line. The present invention concerns any PON system, such Gigabit PON, Ethernet PON, etc wherein one or more uplink bandwidth capacity is varied dynamically over time.

The PON system is a point-to-multipoint Passive Optical Network system. In the illustrated example, the PON system 10 comprises an Optical Line Termination (OLT) 12, an optical fibre link 14 to a splitter 16 for splitting traffic from the OLT to all connected Optical Network Unites (ONUs) 20', 20'', 20''' and for collecting traffic from said connected Optical Network Units via optical fibre links 18', 18'', 18'''.

Each ONU 20', 20'', 20''' connects a Local Area Network (LAN) or a Wide Area Network (WAN) to the PON system. Each LAN is terminated by a Network Termination (NT) 40', 40''' that is connected to a ONU via a link 25', 25'', 25'''. The NT may be some kind of switch 40, e.g. Ethernet Switch, Aggregation Ethernet Switch, IP DSLAM (IP DSL Access Multiplier). The switches connects a number of end users (not shown).

In the point-to-multipoint Passive Optical Network the upstream bandwidth is shared between multiple ONUs. The bandwidth is not necessary shared equally between ONUs and even for a single ONU the bandwidth may vary over time.

In the figure the available uplink bandwidth towards the OLT 12 and the actual amount of traffic sent from each ONU 20 are synchronized by the OLT. No ONU 20 will exceed the bandwidth allocated by the OLT 12.

The problem in a corresponding prior art transmission network system comprising PON technology will now be discussed in more detail with reference to FIGS. 2 and 3.

Figure 2:
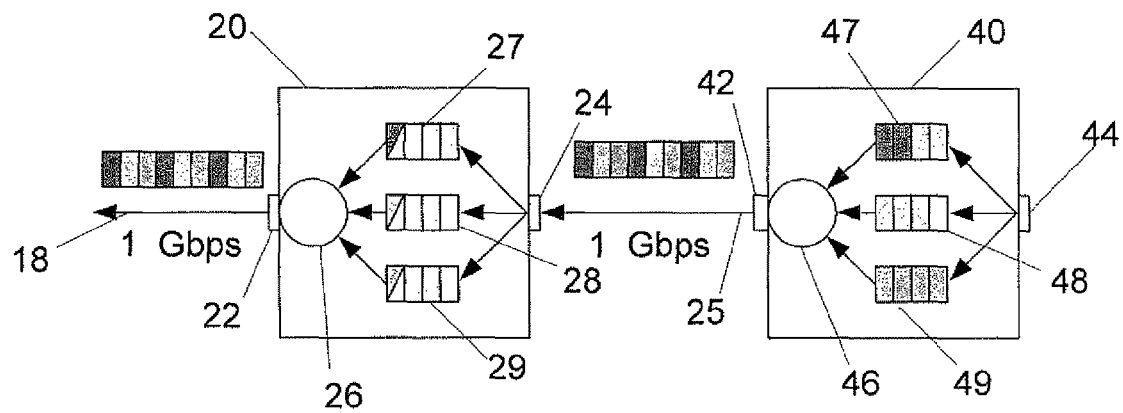
FIG. 2 is a block diagram schematically illustrating the scheduling operation between an ONU node and a NT node of a PON system according to prior art when the data rate of the uplink interface and downlink interface is set to the same value.

FIG. 2 is a block diagram schematically illustrating the scheduling operation between an ONU node and a NT node of a PON system according to prior art when the data rate of the uplink interface and downlink interface is set to the same value, in this case 1 Gbps. The ONU 20 and NT 40 is very schematically illustrated in that a lot of different components is not illustrated in the figures or discussed in the description. Said components have been deliberately omitted as said components do not contribute to the description or the understanding of the problems of interest existing in the prior art network system of the above described kind.

With reference to FIG. 2, the Network Termination device 40 is provided with a number of data packet queue buffers 47, 48, 49 and a scheduler 46 for taking QoS decisions regarding when to transmit said data packets upstream in dependency to their individual priority classification. For example, the NT 40 could be an aggregation switch having a number of IP DSLAMs that are connected to its downlink interface 44. To ensure QoS through-out the LAN both the switch and IP DSLAM will schedule the traffic to ensure that e.g. Management traffic always has highest priority and Voice over IP traffic has higher priority than normal Internet traffic.

The NT 40 has also an uplink interface 42 connected to the interface 25 between the NT 40 and the ONU 20. The ONU 20 for terminating a passive optical network PON comprises an uplink interface 22 for transmitting upstream data packet communication to at least one upstream positioned network node and a downlink interface 24 for receiving upstream data packet communication from at least one downstream positioned transmission network. The uplink interface 22 is connected to a optical fiber link (OL) 18 and the downlink interface 24 is connected to a link or transmission channel 25. It is up to the ONU to ensure the High priority packets are sent before Low priority depending on the scheduling mechanism. The ONU 20 is therefore provided with a scheduler 26. The scheduling options in the ONU can be more or less advanced. Schemes like Strict Priority, Weighted Round Robin or Deficit Round Robin may be implemented increasing the complexity of the ONU. The link 25 between the ONU and NT has a fixed data rate/bandwidth, while the uplink 18 may vary in data speed below that of the fixed. If the interface 25 between the ONU and NT is fixed at e.g. 1 Gbps, the ONU must accommodate a rate of received data packets in queue storing elements 27, 28, 29, e.g. buffers having enough buffering capacity, while the uplink bandwidth may be allocated below 1 Gbps. The data packets are stored in different queues and buffers depending on their individual QoS classification. An ONU according to prior art will therefore need a complex structure of buffers and queue distribution means to be able to satisfactory fulfill the Quality of Service requirements.

Figure 3:
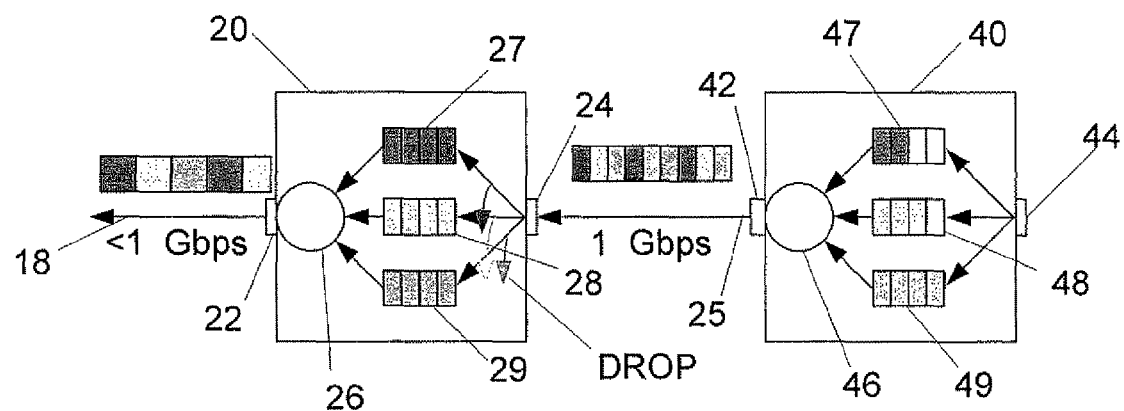
FIG. 3 is a block diagram schematically illustrating the scheduling operation between an ONU node and a NT node of a PON system according to prior art when the data rate of the uplink interface is lower than the data rate of the downlink interface.

FIG. 3 is a block diagram schematically illustrating the scheduling operation between an ONU 20 node and a NT 40 node of a PON system according to prior art when the data rate of the uplink interface is lower than the data rate of the downlink interface. In the figure the ONU will always schedule the upstream traffic according to the actual uplink bandwidth. This will ensure that the queues are serviced according to the scheduling defined by the system or operator.

The problem occurs with the aggregation switch where the transmitted traffic towards the ONU is scheduled according to the link speed (between switch and ONU) which could be 1 Gbps, while the PON uplink may be much lower depending on the bandwidth allocation. If the PON uplink of the ONU is less then the downlink the ONU will start buffering packets. If the bandwidth and traffic load remains different long enough, the queue buffers will become full, and excess packets will be dropped. When traffic is dropped by the ONU the scheduling and possible drop decision made by the switch will not be as effective as the ONU will re-schedule and drop traffic according to a different uplink capacity.

Figure 4:
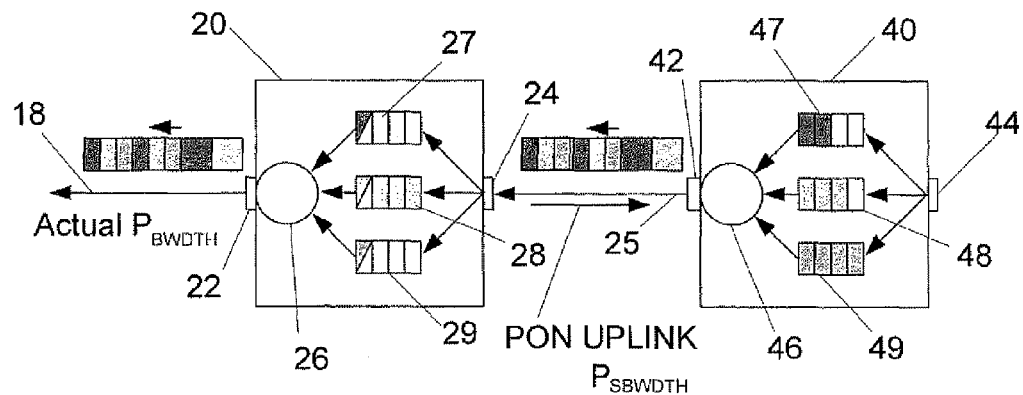
FIG. 4 is a block diagram schematically illustrating the scheduling operation between an ONU node and a NT node of a PON system according to the present invention.

FIG. 4 is a block diagram schematically illustrating the scheduling operation between an ONU node and a NT node of a PON system according to the present invention, which suggests a solution to the congestion problem in the ONU. Said problem is solved by involving means for determining a momentary parameter value of the transmission bandwidth capacity of the optical uplink ($OL_U$) 18 to the ONU design and transmit said actual bandwidth capacity value $P_{SBWDTH}$ in a downstream message to at least the closest downstream situated scheduler, i.e. the scheduler 46 of the NT 40. Said scheduler 46 will adapt its scheduling of the upstream data packet communication to the PON transmission bandwidth capacity.

One positive effect by transmitting the actual bandwidth capacity to the closest downstream situated scheduler 46 is that the upstream data packet queues are serviced according to the scheduling defined by the system or operator. The NT scheduler 46 will deliver the same QoS mechanism as the scheduler 26 of the ONU 20.

Figure 5:
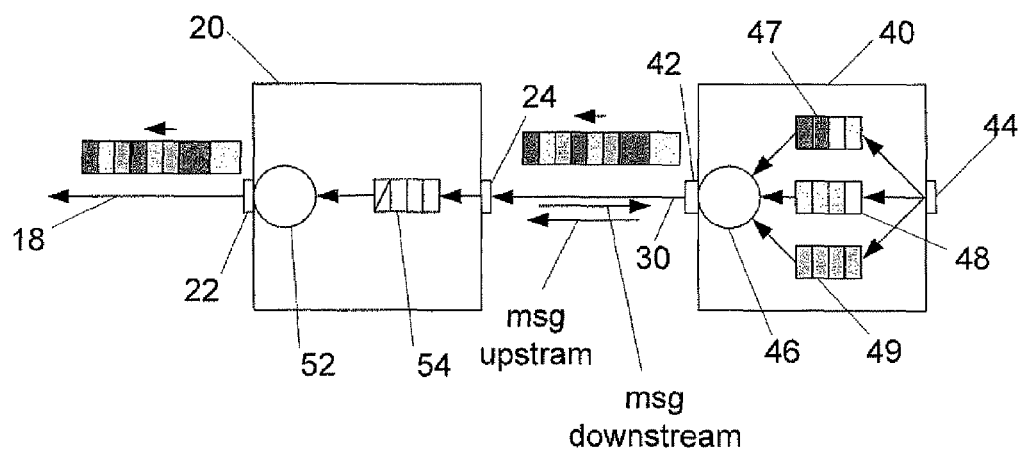
FIG. 5 is a block diagram schematically illustrating an ONU device according to the present invention.

FIG. 5 is a block diagram schematically illustrating a simplified ONU according to the present invention. The data packet traffic received from the attached node 40 will be in accordance with the uplink bandwidth and no reordering/packet drop is required in the ONU 20. A less advanced scheduling mechanism 52 is therefore required in the ONU 20. Only FIFO (First-In-First-Out) scheduling is needed. Further, a less complicated queue buffering system 54 for serving the FIFO scheduling is necessary.

The ONU 20 continues to schedule the upstream traffic according to the actual uplink bandwidth, but the scheduling task for scheduling the upstream data packet communication is moved to said PON external scheduler 46 of the NT outside the PON system.

The advantages of the invention are reduced complexity in the ONU, thus cost, simpler management and easier software upgrade.

Other scheduling control parameters $P_S$ than the actual bandwidth capacity $P_{SBDWTH}$ may be transmitted from the ONU 20 node to the NT 40 node. One such control parameter could be the ONU buffer queue usage $P_{SBQU}$.

Rapid changes in the PON uplink bandwidth may cause the NT not to adopt the egress traffic towards the ONU at the same rate. Communicating how many buffers are in queue will allow the NT to make calculations and adjust the send rate towards the ONU to ensure the ONU buffer queue is emptied. This will ensure that buffer usage in the ONU is not increasing as this will make the scheduling in the NT ineffective.

In more general terms, at least one scheduling control parameter ($P_S$) of a set of different scheduling control parameters is determined and transmitted said parameter or parameters downstream to a node comprising a PON external scheduler, whereby the scheduling task for scheduling the upstream data packet communication in the PON Uplink is moved to said PON external scheduler which is configured to receive the determined parameter value or values.

Figure 6:
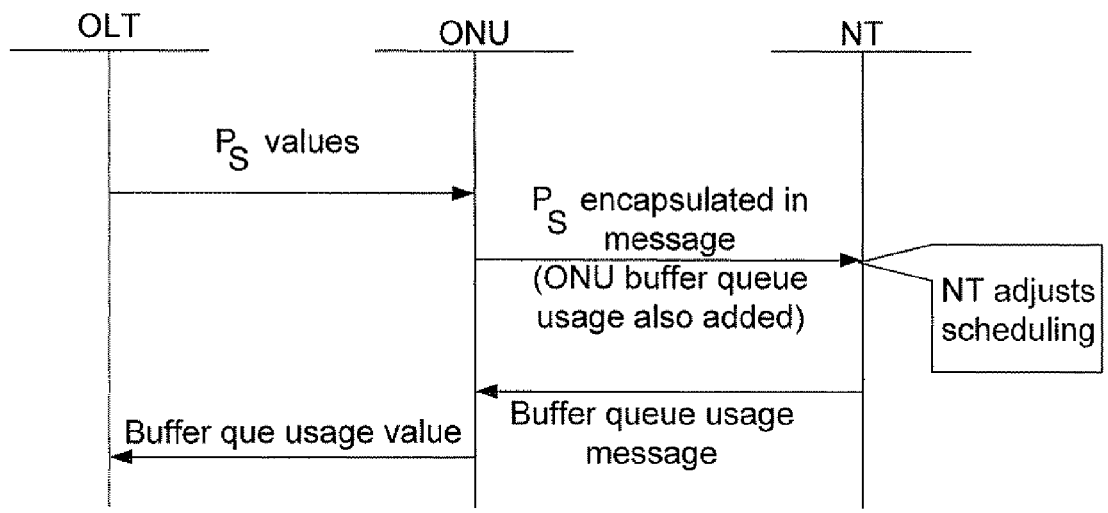
FIGS. 6-7 are signaling schemes illustrating a method according to the present invention.
Figure 7:
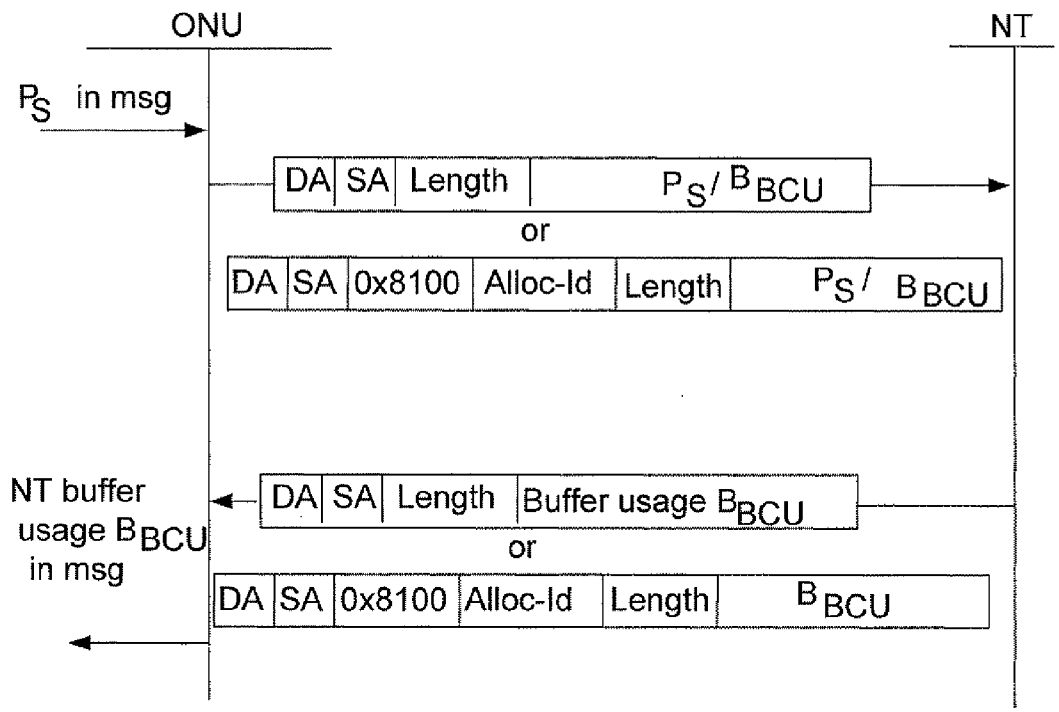

The signaling or transmission of scheduling control parameters between the ONU and NT will now be describe in more detail with reference to FIGS. 6 and 7.

FIGS. 6 and 7 are signaling schemes illustrating the protocols used for carrying and transfer the actual scheduling control parameters in the transmission network comprising an ONU in a PON system and a NT node in a network using other transmission technology from the PON system.

First, the OLT 12 will generate a message, e.g. GTC protocol, comprising scheduling control parameter values, e.g. allocated bandwidth $P_{SBWDTH}$ for the PON uplink, to the ONU 20, which will read the fields of the GTC protocol.

As an illustrating example, a Gigabit Passive Optical Network (GPON) will be described. The PCBd (Physical Control Block downstream) fields of a GTC protocol may be used for transporting the parameter values in a GPON system. Every 125 us the OLT will send a GTC downstream frame to the ONU. The GTC frame consists of two blocks: PCBd and Payload. The PCBd fields contain all relevant information for a T-CONT, which is a logical channel in a PON system. The identity of the T-CONT is part of the PCB information. The GTC protocol is used to communicate from OLT to ONU and from ONU to OLT. The GTC frame in downstream direction differs in content from upstream GTC frames. Both types of frames consist of several blocks of information. In the upstream GTC frame one of the block of information is the DBRu (Dynamic Bandwidth Report Upstream) that tells the OLT whether traffic is in queue for this T-CONT. The rate of the upstream GTC (and DBRu information) is dependant on the bandwidth allocated to the T-CONT. The GTC will follow each data packet sent upstream.

According to the invention, a message is established by the ONU 20 to be sent between the ONU 20 and the NT 40 allowing the ONU 20 to communicate the $P_S$ values, e.g. bandwidth capacity $P_{SBWDTH}$ and buffer capacity usage $P_{SBCU}$, to the NT 40. When the message is received by the NT 40, the processing unit of the NT will identify and read the received actual scheduling control parameters values and adjust the scheduling accordingly.

The present invention is provided with an additional message protocol which enables the NT 40 to communicate upstream the number of buffers in queue on its side. This information will be processed and used by the ONU 20 in the upstream status reporting with DBRu (Dynamic Bandwidth Report Upstream) messages to the OLT. To fully utilize the capabilities of Dynamic Bandwidth Allocation by the OLT, a message denoted SR DBA (Status Reporting Dynamic Bandwidth Allocation) is used.

Alternatively, if NSR (Non-Status Reporting) is used, the buffer queue signaling from NT to ONU is not needed. The message will utilize information from the downstream GTC (GPON Transmission Convergence) frame, where the Upstream Bandwidth Mapping (US BW map) is calculated for the ONU(s) by the OLT.

FIG. 7 is illustrating examples of different fields and frames in the messages sent in the two opposite directions between the ONU and NT.

As an example, the ONU 20 encapsulates the complete GTC frame in Ethernet frames and sent towards the NT 40, to minimize the processing overhead of the ONU 20 and make the overall implementation scalable. To minimize configuration in the ONU 20 both the Source MAC Address (SA) and Destination MAC Address (DA) are addresses with the "Universally/Locally Administered address" bit set indicating local addresses, see Table 1: MAC address representation. This will make it possible to implement pattern search and identification in the NT 40, e.g. normal Switch fabric filtering or Network Processor micro code.

TABLE 1

MAC address representation

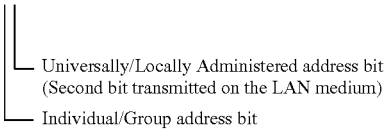

The following Internet site (http://standards.ieee.org/regauth/groupmac/tutorial.html) is recommended for studies regarding more information about MAC address representation.

Figure 8:
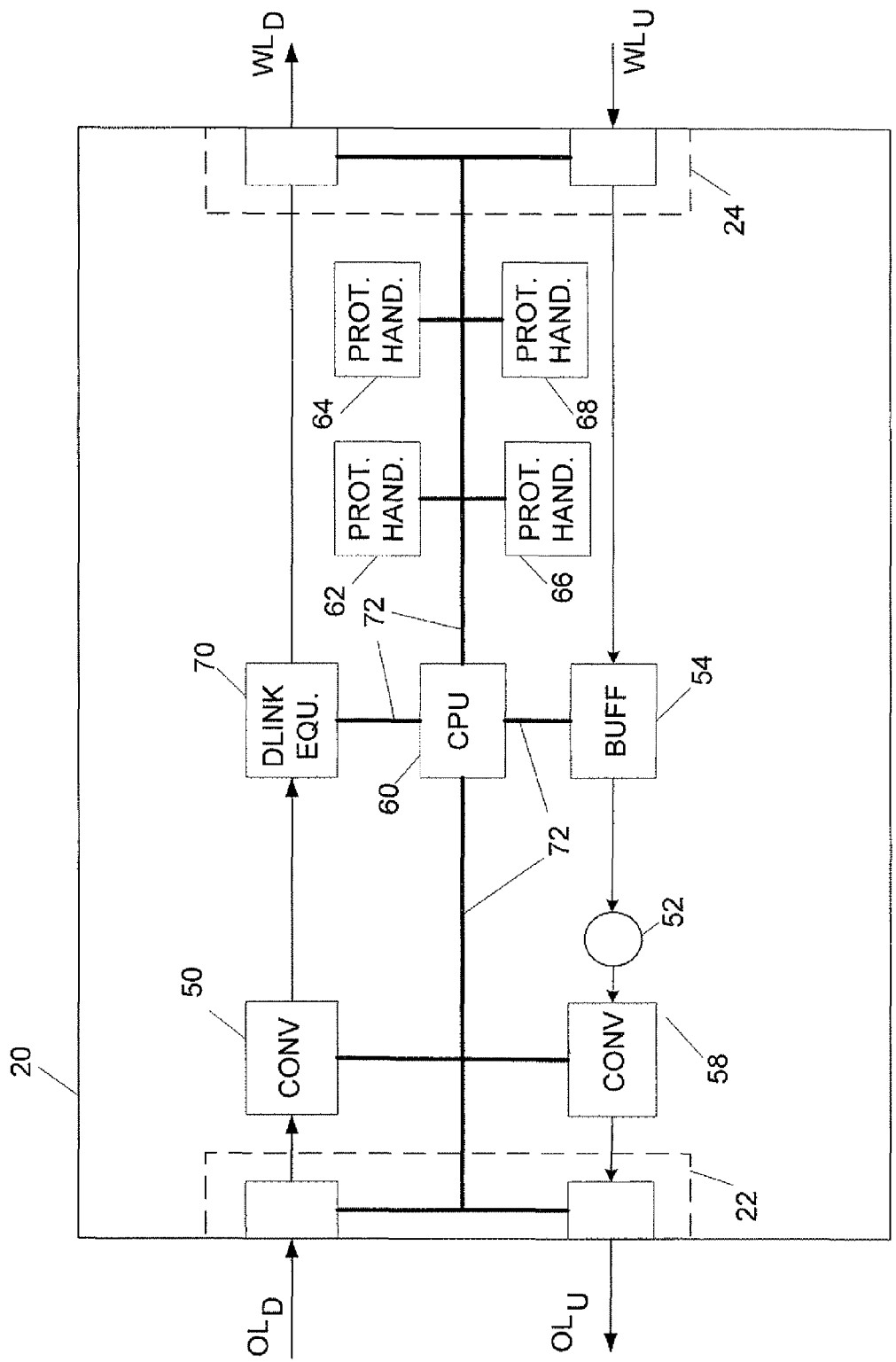
FIG. 8 is a block diagram schematically illustrating in more details an ONU device according to the present invention.

A first embodiment of an Optical Network Unit according to the present invention will now be described in more detail with reference to FIG. 8. The functionality of the UNO according to the present invention has already been described in the description with reference to FIGS. 4-7 herein.

The Optical Network Unit, ONU, 20 is connected into and is terminating a Passive Optical Network (PON). The ONU comprises a downlink interface 24 for receiving upstream data packet communications $WL_U$ from a downstream positioned network connected to the ONU, and to transmit data packets downstream $WL_D$. The downlink interface 24 is connected to the closest node of said network, and which comprises a Network Termination NT (40 in FIG. 1). The NT comprises a scheduler device, as described above. The ONU further comprises an uplink interface 22 for transmitting the received upstream data packet communications ($WL_U$) via optical uplink $OL_U$ to an upstream positioned network Optical Line Termination in a node. The interface 22 receives downstream data packet communications $OL_D$.

Further, the ONU 20 comprises converter means 50 for converting data packet communications in a downstream direction from a PON system using PON transmission technology. Said communications are converted to a second transmission technology used in the downlink network. The converter means 58 for converting data packet communications in an upstream direction from the second transmission technology of the downlink network to the uplink PON network technology is also provided in the ONU 20.

According to the present invention, the ONU 20 is provided with means 62 for determining a momentary parameter value of at least one scheduling control parameter ($P_S$) of a set of different scheduling control parameters. Said parameter values may either be received directly from the OLT, or the parameter values may be derived from received data values from the OLT. Said parameter values or data values is preferably transferred in a message, such as a suitable protocol. If the network is a Gigabits PON, the message is preferably a GTC (GPON Transmission Convergence) protocol carrying a Upstream Bandwidth map with the actual uplink bandwidth value. It should comprise at least one scheduling control parameter ($P_S$) of said set of different scheduling control parameters which is related to a corresponding QoS setting of a set of QoS settings defined for an optical uplink ($OL_U$) provided by a PON to which the ONU 20 is connected.

The ONU 20 is further comprising means 64 for transmitting each determined parameter value to a downstream positioned network node comprising a PON external scheduler, said parameter is used for adapting said scheduler to the scheduling control parameter ($P_S$) of the optical uplink ($OL_U$) in accordance with the latest determined parameter value. Said means 64 is adapted to insert the determined momentary parameter value of a scheduling control parameter as an message to the downstream positioned NT comprising the PON external scheduler. If the ONU receives a GTC protocol as a message from the OLT, said GTC protocol may be sent as an encapsulated message to the NT.

In one alternative embodiment of the invention, said determined and transmitted parameter value is the momentary transmission bandwidth capacity of an optical uplink ($OL_U$) provided by a PON to which the ONU 20 is connected.

A T-CONT (Transmission Container) is a logical channel on the PON fibre. Any one ONU may have several T-CONTs assigned. In stead of having one T-CONT with 10 MBps allocated, the ONU could have 3 T-CONT: One with 512 kbps for Voice traffic, one with 6 MBps for a video channel and the rest for Internet surfing. The uplink transmission capacity may be divided between more than one T-CONT, i.e. multiple T-CONT, which is used for end-user separation or traffic separation (based on traffic type or priority). In this case each T-CONT may be considered a virtual uplink with its own (set of) scheduling parameter(s) that can be individually signaled to downlink positioned scheduler(s). The traffic or related signaling between the ONU and NT(s) may utilize 802.1Q VLAN tagging for separation. This alternative is not excluded from the invention, however, it adds some complexity.

Alternatively, the ONU is further comprising means 68 for handling status messages and status reports. Said means 68 for handling transmission status messages and status reports is adapted to receive a buffer queue usage message from the downstream positioned scheduler. It will also comprise means for temporary storing the message content of received messages or protocols. Said means 68 is also adapted to send the buffer queue usage in a suitable message addressed to the OLT. Such a suitable message is the DBRu (Dynamic Bandwidth Report Upstream) protocol. Said means 68 is also performing processing of information in said buffer queue usage messages and determining the parameter content of the DBRu messages.

The ONU further comprises a scheduler 52 for scheduling the data packets upstream in the same order as they were scheduled by the scheduler in the Network Termination and received by the downlink interface.

The ONU is controlled by a processing unit 60, which is controlling, e.g. via the indicated control bus 72, the interfaces 22, 24, converters 50, 58, scheduler 52, buffering means 54, downstream devices 70 and Protocol handling means 62, 64, 66, 68 comprised in the ONU.

Figure 9:
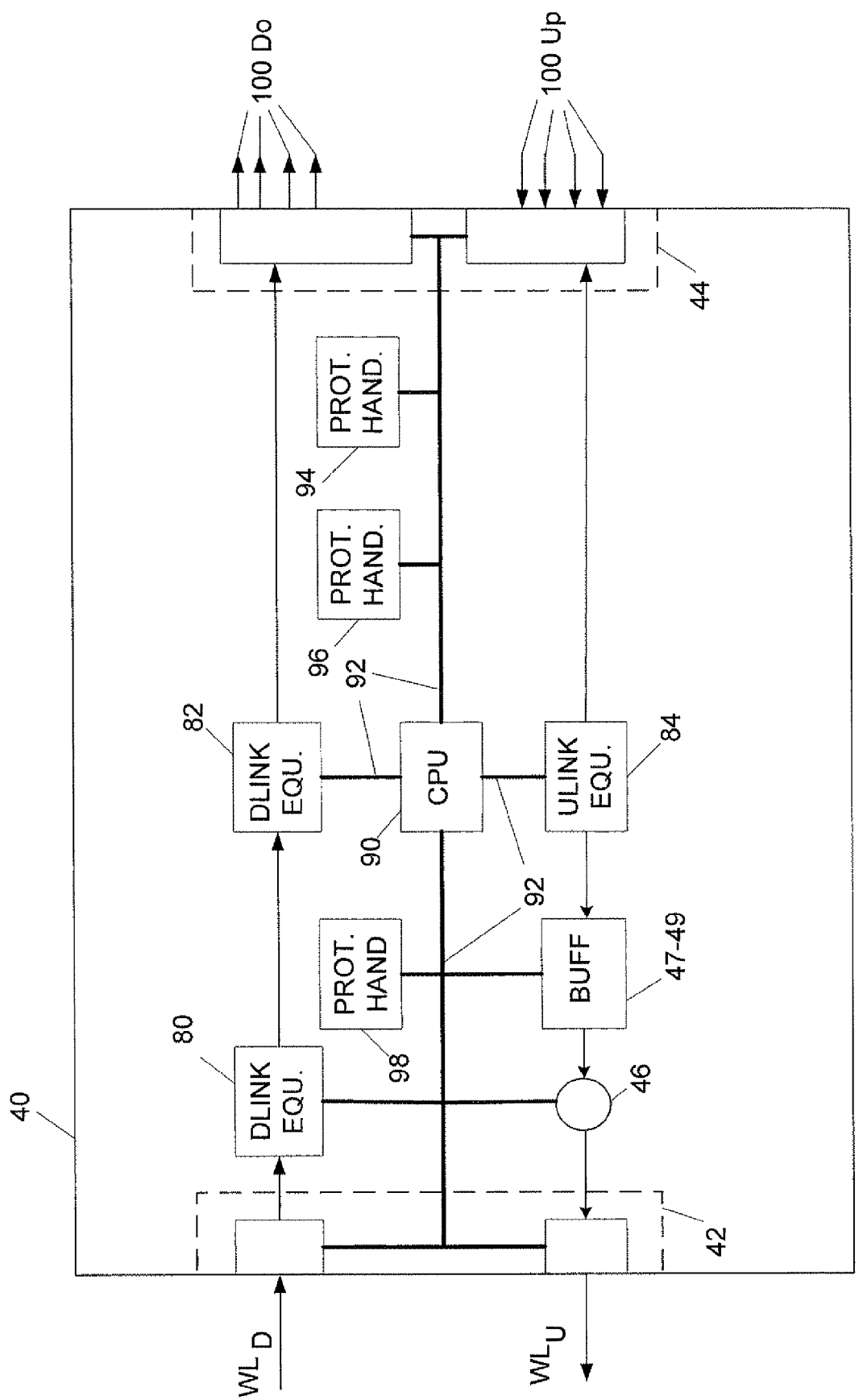
FIG. 9 is a block diagram schematically illustrating in more details a Network Termination device according to the present invention.

Finally, a Network Termination NT device 40 will be described in more detail with reference to FIG. 9.

The NT device 40 may be an aggregation Ethernet switch or an access device, for example IP DSLAM or an Ethernet switch. Said switching devices is well-known in prior art and comprises a lot of different components such as uplink interface 42 and downlink interface 44 for receiving and transmitting data packet communications. The downlink interface 44 is adapted to receive upstream data packet traffic 100 Up from connected end-users (not shown) and transmit data packet traffic downstream 100 Do to said end-users. A processing unit CPU 90 is controlling the different means, interfaces 42, 44, scheduler 46, buffering means 47-49 (compare with FIGS. 2-6), switching means 82, 84, etc. The processing unit 90 is controlling said functional entities e.g. via a data bus 92.

The processing unit 90 is adapted to control message means 96 for identifying and reading actual scheduling control parameters $P_S$ values received from an upstream positioned Optical Network Unit device and to control means 94 for adjusting the scheduling of the scheduler 46 to operate according to the received actual scheduling control parameters $P_S$ values.

In an alternative embodiment, said Network Termination is also comprising means 98 for determining at least one value of the buffer queue usage, $B_{BCU}$, of the buffering means.

In said alternative embodiment, the message means 96 is adapted for generating outgoing messages involving said buffer queue usage value in a message addressed to said ONU.

Thus, the NT device 40 is adapted to support a connected ONU in the PON system. The NT device is provided with a number of means for supporting the communication described above with reference to the signalling scheme in FIG. 6.

As described in FIG. 6, the OLT 12 will generate a message, e.g. GTC protocol, comprising scheduling control parameters, e.g. allocated bandwidth $P_{SBWDTH}$ for the PON uplink, to the ONU 20, which will read the fields of the GTC protocol. According to the invention, a message is established by the ONU 20 to be sent between the ONU 20 and the NT 40 allowing the ONU 20 to communicate the $P_S$ values, e.g. bandwidth capacity $P_{BWDTH}$ and buffer usage $P_{SBQU}$, to the NT 40. When the message is received by the NT 40, the processing unit 90 of the NT 40 will initiate the message means 96 for identifying and reading the received actual scheduling control parameters $P_S$ values. The processor 90 will further activate means 94 for adjusting the scheduling of the scheduler 46 accordingly.

Alternatively, the NT 40 is provided with means 98 which checks the buffering means 47-49 for continuously or periodically determining a value of the buffer queue usage. Said value is inserted by message means 96 in a suitable message or protocol. The message means 96 is also adapted for generating outgoing messages involving said buffer queue usage value in a message addressed to said ONU. This information will be processed and used by the ONU 20 in the upstream status reporting with DBRu (Dynamic Bandwidth Report Upstream) messages to the OLT.

The present invention solves as stated above the congestion problem in the ONU. One advantage is that the traffic received from the attached NT node and network will be in accordance with the uplink bandwidth of the ONU and no reordering/packet drop is required in the ONU.

A number of embodiments of the present invention have been described. It will be understood that various modifications may be made without departing from the scope of the invention. Therefore, other implementations are within the scope of the following claims defining the invention.

| APPENDIX-abbreviations | |
| --- | --- |
| BW | Bandwidth |
| DBA | Dynamic Bandwidth Allocation |
| DBRu | Dynamic Bandwidth Report Upstream |
| DSL | Digital Subscriber Link |
| Gbps | Gigabits per second |
| GTC | GPON Transmission Convergence |
| GPON | Gigabit Passive Optical Network |
| IP | Internet Protocol |
| IP DSLAM | IP DSL Access Multiplier |
| PON | Passive Optical Network |
| NSR | Non-status reporting |
| NT | Network Termination |
| OAM | Operations, Administration and Maintenance |
| OLT | Optical Line Termination |
| ONU | Optical Network Unit |
| PCBd | Physical Control Block Downstream |
| QoS | Quality of Service |
| SR | Status Reporting |
| US | Upstream |
| T-CONT | Transmission Container |

The invention claimed is:

1. An Optical Network Unit (ONU), for terminating a passive optical network (PON) operating according to a PON transmission technology, said ONU comprising:
   a memory storing program instructions; and
   a processor coupled to the memory and configured to execute the program instructions, whereby the ONU is operative to:
      receive, via a Downlink interface, upstream data packet communication from at least one downstream-positioned network operating according to a different, second transmission technology;
      transmit, via an Uplink interface, upstream data packet communication to at least one upstream-positioned PON network node via an optical uplink;
      convert data packet communication in a downstream direction from the PON transmission technology to the second transmission technology;
      convert data packet communication in an upstream direction from the second transmission technology to the PON technology;
      determine a momentary parameter value of at least one scheduling control parameter of a set of different scheduling control parameters of the optical uplink;
      transmit each determined scheduling control parameter momentary value to at least the closest node in the downstream-positioned network operating according to the second transmission technology, wherein the node comprises a scheduler, and wherein each of said scheduling control parameter values is used by the node to adapt the scheduler operation to the latest determined parameter values of the scheduling control parameter received from the ONU; and schedule the data packets upstream to the PON in the same order as they were scheduled by said downstream-positioned scheduler and received by the Downstream interface.

2. The Optical Network Unit according to claim 1, wherein at least one scheduling control parameter of said set of different scheduling control parameters is related to a corresponding quality of service (QoS) setting of a set of QoS settings defined for an optical uplink provided by a PON to which the ONU is connected.

3. The Optical Network Unit according to claim 1, wherein said determined and transmitted parameter value is the momentary transmission bandwidth capacity of an optical uplink provided by a PON to which the ONU is connected.

4. The Optical Network Unit according to claim 1, further comprising a buffer for temporarily storing message content of received signals.

5. The Optical Network Unit according to claim 1, wherein the ONU is further operative to handle status messages and status reports.

6. The Optical Network Unit according to claim 5, wherein the ONU is further operative to insert the determined momentary parameter value of a scheduling control parameter as an encapsulated message to one or more downstream-positioned schedulers.

7. The Optical Network Unit according to claim 5, wherein the ONU is further operative to receive a buffer queue usage message as a message from the downstream-positioned scheduler.

8. The Optical Network Unit according to claim 7, wherein the ONU is further operative to process information in said buffer queue usage messages and determine Dynamic Bandwidth Report Upstream (DBRu) parameter content.

9. The Optical Network Unit according to claim 1, wherein said ONU is configured to be located in a node of a Gigabit Passive Optical Network.

10. The Optical Network Unit according to claim 9, wherein said ONU is configured to communicate with a Network Termination device in a node of the downstream-positioned network operating according to the second transmission technology.

11. A method in an Optical Network Unit (ONU) for scheduling control of an upstream data packet communication through the ONU, the method comprising the steps of:

determining a momentary parameter value of at least one scheduling control parameter of a set of different parameters;

transmitting each determined momentary parameter value to at least one downstream-positioned node, said node comprising a scheduler operating in a network utilizing a different transmission protocol than utilized by the ONU;

receiving on a downlink interface from the at least one downstream-positioned node, the upstream data packet communication; and transmitting upstream, the upstream data packet communication received from the at least one downstream-positioned node, wherein the data packets are scheduled for upstream transmission in the same order as they were scheduled by the at least one downstream-positioned node and received on the downlink interface.

12. The method according to claim 11, wherein at least one scheduling control parameter of said set of different scheduling control parameters is related to a corresponding Quality of Service (QoS) setting of a set of QoS settings defined for an optical uplink provided by a passive optical network (PON) to which the ONU is connected.

13. The method according to claim 11, wherein said determined and transmitted momentary parameter value is a momentary transmission bandwidth capacity of an optical uplink provided by a passive optical network (PON) to which the ONU is connected.

14. The method according to claim 13, wherein said momentary transmission bandwidth capacity is partially distributed as a committed traffic rate to multiple downstream positioned nodes.

15. The method according to claim 11, further comprising temporarily storing message content of the signals received on the downlink interface in a buffer.

16. The method according to claim 11, further comprising handling status messages and status reports.

17. The method according to claim 16, wherein handling status messages and status reports comprises distributing resources characterized by the determined momentary parameters in encapsulated messages to the at least one downstream-positioned node.

18. The method according to claim 16, wherein handling status messages and status reports comprises:

receiving a buffer queue usage message as an encapsulated message from the at least one downstream-positioned node; and processing information in said buffer queue usage message and determining Dynamic Bandwidth Report Upstream (DBRu) parameter content.

19. A Network Termination device, comprising:
a scheduler;
a buffer; and
a processing unit, wherein the processing unit is adapted to:
identify and read actual scheduling control parameter values received from an upstream-positioned Optical Network Unit (ONU); and
adjust scheduling of the scheduler to schedule upstream data packets for transmission to the ONU according to the received actual scheduling control parameters values;
wherein the Network Termination device operates in a network utilizing a different transmission protocol than utilized by the ONU.

20. The Network Termination device according to claim 19, further configured to determine at least one value of a level of a buffer queue of the buffer.

21. The Network Termination device according to claim 20, further configured to generate outgoing messages involving the level of the buffer queue in a message addressed to said ONU.

* * * * *

UNITED STATES PATENT AND TRADEMARK OFFICE
CERTIFICATE OF CORRECTION

PATENT NO. : 9,270,404 B2  
APPLICATION NO. : 13/203049  
DATED : February 23, 2016  
INVENTOR(S) : Helleberg Andersen et al.

It is certified that error appears in the above-identified patent and that said Letters Patent is hereby corrected as shown below:

In the Drawings

In Fig. 4, Sheet 3 of 6, delete "$P_{BWDTH}$" and insert -- $P_{SBWDTH}$ --, therefor.

In the Specification

In Column 5, Line 35, delete "then" and insert -- than --, therefor.

In Column 9, Line 56, delete "$P_{BWDTH}$" and insert -- $P_{SBWDTH}$ --, therefor.

Signed and Sealed this
Twenty-seventh Day of December, 2016

Michelle K. Lee
*Director of the United States Patent and Trademark Office*